(12) United States Patent
Wang et al.

(10) Patent No.: US 7,058,039 B2
(45) Date of Patent: Jun. 6, 2006

(54) METHOD AND APPARATUS FOR SELECTING A MODULATION AND CODING SCHEME IN A WIRELESS COMMUNICATION SYSTEM

(75) Inventors: Michael M. Wang, San Diego, CA (US); Hao Bi, Wheeling, IL (US); Tyler A. Brown, Mundelein, IL (US)

(73) Assignee: Motorola, Inc., Schaumburg, IL (US)

( * ) Notice: Subject to any disclaimer, the term of this patent is extended or adjusted under 35 U.S.C. 154(b) by 301 days.

(21) Appl. No.: 10/812,477

(22) Filed: Mar. 30, 2004

(65) Prior Publication Data

US 2005/0226268 A1 Oct. 13, 2005

(51) Int. Cl.
*H04B 7/216* (2006.01)
(52) U.S. Cl. .................. 370/335; 370/342; 370/465
(58) Field of Classification Search .............. None
See application file for complete search history.

(56) References Cited

U.S. PATENT DOCUMENTS

| 6,167,031 | A * | 12/2000 | Olofsson et al. | 370/252 |
| 6,393,012 | B1 | 5/2002 | Pankaj | 370/342 |
| 6,823,005 | B1 * | 11/2004 | Chuang et al. | 375/227 |
| 2003/0081692 | A1 * | 5/2003 | Kwan et al. | 375/295 |
| 2003/0232630 | A1 * | 12/2003 | Wilhelm | 455/552.1 |
| 2001/0120280 | | 6/2004 | Western | |
| 2004/0196801 | A1 * | 10/2004 | Hiramatsu | 370/328 |

FOREIGN PATENT DOCUMENTS

EP 1 255 368 A 11/2002
WO WO 00/13447 3/2000

OTHER PUBLICATIONS

Biglieri et al, Coding and Modulation Under Power Constraints, IEEE, pp. 32-39, 1998.*
Furuskar et al, System Performance of EDGE, a Proposal for Enhanced Data Rates in Existing Digital Cellular System, IEEE, pp. 1284-1289, 1998.*
Yang et al, Adaptive Modulation and Coding in 3G Wireless Systems, IEEE, pp. 544-548, 2002.*
Balachandran et al.: A Proposal for EGPRS Radio Link Control Using Link Adaptation and Incremental Redundancy, Bell Labs Technical Journal, pp. 1-36, Jul.-Sep. 1999.

* cited by examiner

*Primary Examiner*—Frank Duong

(57) ABSTRACT

In a wireless communication system, a scheduler (100) determines (306) a first set of modulation and coding schemes (MCSs), each of which produces a maximum data rate for a first user, in accordance with available resource constraints (304) of the wireless communication system. The scheduler then forms, for each MCS of the first set, a second set of MCSs that produces the maximum data rate for a second user in accordance with a first residual resource (314) that remains when applying that MCS to the first user, thereby producing (316) a group of second sets of MCSs. After producing the group of second sets, the scheduler selects (324), from the first set and for the first user, a first optimal MCS corresponding to one of the group of second sets that allows a highest maximum data rate for the second user.

21 Claims, 3 Drawing Sheets

METHOD AND APPARATUS FOR SELECTING A MODULATION AND CODING SCHEME IN A WIRELESS COMMUNICATION SYSTEM

FIELD OF THE INVENTION

This invention relates in general to wireless data communication systems, and more specifically to a method and apparatus for selecting a modulation and coding scheme (MCS).

BACKGROUND OF THE INVENTION

Advanced wireless communication systems such as CDMA2000 can select from a wide variety of modulation and coding schemes (MCS) for each transmission. Selection of the MCS is an important concern, because the MCS selected for a first user can affect the maximum data rate of not only that user, but also the maximum data rates of other users in the system. Prior-art data communication systems nonetheless have concentrated on selecting MCSs one user at a time, potentially to the detriment of overall system throughput.

Thus, what is needed is a method and apparatus for selecting a modulation and coding scheme that will improve overall system throughput, resulting in greater utilization of precious wireless bandwidth.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

DETAILED DESCRIPTION OF THE PREFERRED EMBODIMENTS

Figure 1:
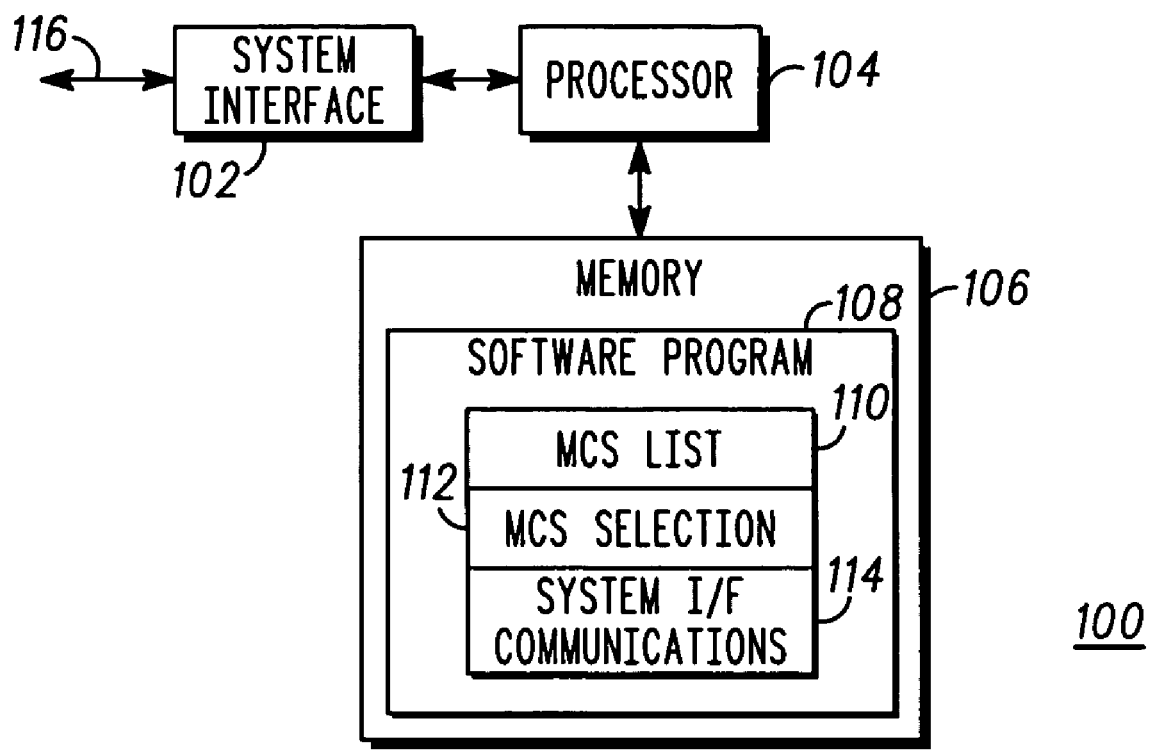
FIG. 1 is an electrical block diagram of an exemplary scheduler.

In overview, the present disclosure concerns communications systems that utilize receivers to provide service for communications units or more specifically a user thereof operating therein. More particularly, various inventive concepts and principles embodied as a method and apparatus for selecting a modulation or coding scheme (MCS) for use in equipment with such communications systems will be discussed and disclosed. The communications systems of particular interest are those being deployed and developed such as W-CDMA (Wideband-CDMA), CDMA2000, 2.5G (Generation), 3G, UMTS (Universal Mobile Telecommunications Services) systems and evolutions thereof that utilize spread spectrum signals, although the concepts and principles may have application in other systems and devices.

The instant disclosure is provided to further explain in an enabling fashion the best modes of making and using various embodiments in accordance with the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms, if any, such as first and second, top and bottom, and the like are used solely to distinguish one from another entity or action without necessarily requiring or implying any actual such relationship or order between such entities or actions. Much of the inventive functionality and many of the inventive principles are best implemented with or in one or more conventional digital signal processors (DSPs), or with integrated circuits (ICs) such as custom or application specific ICs. It is expected that one of ordinary skill, notwithstanding possibly significant effort and many design choices motivated by, for example, available time, current technology, and economic considerations, when guided by the concepts and principles disclosed herein will be readily capable of programming such DSPs, or generating such ICs with minimal experimentation. Therefore, in the interest of brevity and minimization of any risk of obscuring the principles and concepts according to the present invention, further discussion of such DSPs and ICs, if any, will be limited to the essentials with respect to the principles and concepts employed by the preferred embodiments.

Advanced wireless communication systems such as CDMA2000 can select from a wide variety of modulation and coding schemes for each transmission. The modulation and coding scheme (MCS) defines the type of modulation, e.g., BPSK, QPSK, 16QAM, 64QAM etc, along with the code rate, e.g., 0.2, 0.25, 0.3, etc, the number of channel codes, e.g., 20, and the slot duration, e.g., 1.25 ms, 2.5 ms, 6 ms. There are, for example, 127 predetermined MCS choices in CDMA2000, Release C.

In CDMA, channel codes, which are mathematical functions that are orthogonal to one another, e.g., Walsh codes, define the communication channels. It will be appreciated that in TDMA systems the communication channels are defined by time slots, and that in FDMA systems the communication channels are defined by frequencies. Thus the term "code" as used herein is broadly defined to include CDMA channel codes, TDMA time slots, and FDMA frequencies, depending upon the type of communication system. In voice systems like IS-95, one code is associated with one channel which is assigned to one user. In high rate data systems, multiple codes are assigned to a channel to achieve high data rates; i.e., a channel has the capacity to carry data equivalent to multiple voice calls. There are a fixed number of users that can be transmitted to at a time. For example, only two users can be transmitted to at a time in CDMA2000. These two users share a pool of 28 Walsh codes. Their MCSs determine how many codes each user will use. Each MCS requires a corresponding known amount of transmit power. There is a maximum available transmit power that can be allocated to the user(s). Once an MCS is selected, the power required is determined. It has to be less than the maximum available transmit power, else the MCS cannot be utilized.

Briefly, in one embodiment in accordance with the present invention, users needing a data transmission are prioritized according, for example, to a well-known priority criterion, e.g., Proportional Fair. A scheduler then determines, for the first user in the queue (the highest-priority user), all the MCS candidates that will provide the maximum data rate for the available resources. Next, the scheduler determines, for the second user in the queue (the second-highest-priority user), all the MCS candidates which will provide the second user with the maximum data rate for the resources leftover by each of the first user MCS candidates. The scheduler then selects as the optimum MCS for the first user one of the MCS candidates of the first user that provides the highest maximum data rate for the second user. This process continues until the maximum CDMA user limit is reached or no more resources are available.

Referring to FIG. 1, an electrical block diagram depicts an exemplary scheduler 100 in accordance with the present invention, comprising a processor 104 for controlling the scheduler. The scheduler 100 further comprises a memory 106 coupled to the processor 104 and comprising a software program 108 including executable instructions and data for programming the processor 104. The software program 108 comprises an MCS list 110 defining the MCS choices available to the scheduler 100, along with the properties of each MCS, including the transmit power required and the number of codes utilized. The software program 108 also includes an MCS selection program 112 for programming the processor 104 to select an MCS for each user in accordance with the present invention, as is disclosed further herein below. In addition, the software program 108 includes a system interface communications program 114 for programming the processor 104 to control a system interface 102 to communicate with the wireless communication system over a conventional communications link 116 for cooperating with the wireless communication system to select the MCSs in accordance with the present invention.

We now disclose a technique for efficient MCS selection and scheduling in accordance with the present invention. Assume there are N users in the current queue and they are prioritized according to a well-known criterion such as the Proportional Fair criterion. It will be appreciated that, alternatively, other criteria can be used instead for prioritizing the users, e.g., the Maximum C/I criterion. The first (highest priority) user's MCS is selected by maximizing the data rate for the given available resources (for example, power and codes) to get a set of maximum rate MCS candidates $$\mathfrak{m}^1 = \{m^1[k^1], k^1 = 1, 2, \cdots, K^1\} = \arg\max_{m \in \mathfrak{m}}\{R(m) : \mathbb{C}^1\} \quad (1)$$

where M is the set of all available MCSs, $C^1$ is the resource constraints $$P(m) \leq P^1$$

$$C(m) \leq C^1 \quad (2)$$

preferably combined with other constraints, such as retransmission constraints and duration constraints, where $P(m)$ and $C(m)$ are the required power and number of codes for MCS level m, $P^1$, $C^1$ are the total available power and codes for packet data users, and $$R(m) = L(m)/T(m) \quad (3)$$

is the data rate provided by MCS level m where $L(m)$ and $T(m)$ are the corresponding encoding packet size and duration, respectively. Note that all the MCSs in the candidate set (1) provide the same maximum data rate, $$\gamma^1 = \max_m\{R(m) : \mathbb{C}^1\}.$$

That is to say, for the first user, for the given resource constraints, the MCS selected in the candidate set does not affect the first user's data rate. However, the MCS selected can affect the second user's MCS selection and data rate. Consequently, the MCS for the first user preferably is the one from the candidate set that maximizes the second user's data rate.

We find a group of the MCS candidate sets that maximize the second user's data rate for each MCS in the first user's candidate set in (1)

$$\mathfrak{m}^2 = \{\mathfrak{m}^2_{k^1}, k^1 = 1, 2, \cdots, K^1\} \quad (4)$$

where $$\mathfrak{m}^2_{k^1} = \{m^2_{k^1}[k^2], k^2 = 1, 2, \cdots, K^2_{k^1}\} = \arg\max_{m \in \mathfrak{m}}\{R(m) : \mathbb{C}^2_{k^1}\} \quad (5)$$

where $C_{k^1}^2$ are the resource constraints $$P(m) \leq P^2(m^1[k^1]) = P^1 - P(m^1[k^1])$$

$$C(m) \leq C^2(m^1[k^1]) = C^1 - C(m^1[k^1]) \quad (6)$$

combined with other constraints, such as the retransmission constraints and the duration constraints. The corresponding data rate for $M^2$ is $$R^2 = \{\gamma^2_{k^1}, k^1 = 1, 2, \cdots, K^1\} \quad (7)$$

and $$\gamma^2_{k^1} = \max_{m \in \mathfrak{m}}\{R(m) : \mathbb{C}^2_{k^1}\} \quad (8)$$

corresponds to the data rate of $M_{k^1}^2$.

We then find the first user's optimal MCS that gives the second user maximum data rate:

$$\kappa^1 = \arg\max_{k^1 \in \{1,2,\cdots,K^1\}} \{\gamma^2_{k^1}\}. \quad (9)$$

The optimal MCS for the first user is $$m^1[\kappa^1]. \quad (10)$$

The corresponding set of MCS candidates that has the maximum data rate, $\gamma_{\kappa^1}^2$, is $$M_{\kappa^1}^2 = \{m_{\kappa^1}^2[k^2], k^2 = 1, 2, \ldots, K_{\kappa^1}^2\}. \quad (11)$$

Similarly, to determine the $2^{nd}$ user's optimal MCS from a set of candidates in (11), we first find for the third user the group of the maximum MCS candidate sets for second user MCS candidates in (11)

$$\mathfrak{m}^3 = \{\mathfrak{m}^3_{k^2}, k^2 = 1, 2, \cdots, K^2_{k^1}\} \quad (12)$$

where $$\mathfrak{m}^3_{k^2} = \{m^3_{k^2}[k^3], k^3 = 1, 2, \cdots, K^3_{k^2}\} = \arg\max_m\{R(m) : \mathbb{C}^3_{k^2}\} \quad (13)$$

where $C_{\kappa^2}^3$ are again the resource constraints $$P(m) \leq P^3(m_{\kappa^1}^2[k^2]) = P(m^1[\kappa^1]) - P^2(m_{\kappa^1}^2[k^2])$$

$$C(m) \leq C^3(m_{\kappa^1}^2[k^2]) = C(m^1[\kappa^1]) - C^2(m_{\kappa^1}^2[k^2]) \quad (14)$$

plus other constraints. The corresponding data rates of $M^3$ are $$R^3 = \{\gamma_{k^2}^3, k^2 = 1, 2, \cdots, K_{k^1}^2\} \tag{15}$$

where $$\gamma_{k^2}^3 = \max_m \{R(m): \mathbb{C}_{k^2}^3\} \tag{16}$$

corresponds to $M_{k^2}^3$.

Now we can choose the second user's optimal MCS by maximizing the third user's data rate $$\kappa^2 = \underset{k^2 \in \{1,2,\cdots,K_{k^1}^2\}}{\arg\max} \{\gamma_{k^2}^3\}. \tag{17}$$

The optimal MCS for the $2^{nd}$ user is $$m_{78}{}^{12}[\kappa^2]. \tag{18}$$

The corresponding set of maximum rate MCS candidates for the $3^{rd}$ user is $$M_{\kappa^2}^3 = \{m_{\kappa^2}^3[k^3], k^3 = 1,2,\ldots, K_{\kappa^2}^3\} \tag{19}$$

with associated maximum data rate of $\gamma_{\kappa^2}^3$.

In general, we find the $n-1^{th}$ user's MCS candidate set $$\mathfrak{m}_{k^{n-2}}^{n-1} = \{m_{k^{n-2}}^{n-1}[k^{n-1}], k^{n-1} = 1, 2, \cdots, K_{k^{n-2}}^{n-1}\}. \tag{20}$$

The group of maximum data rate MCS sets for the $n^{th}$ user corresponding to the MCS candidates in (20) is $$\mathfrak{m}^n = \{\mathfrak{m}_{k^{n-1}}^n, k^{n-1} = 1, 2, \cdots, K_{k^{n-2}}^{n-1}\} \tag{21}$$

where $$\mathfrak{m}_{k^{n-1}}^n = \{m_{k^{n-1}}^n[k^n], k^n = 1, 2, \cdots, K_{k^{n-1}}^n\} \tag{22}$$

$$= \underset{m \in \mathfrak{m}}{\arg\max}\{R(m): \mathbb{C}_{k^{n-1}}^n\}$$

corresponding to the $n-1^{th}$ user's MCS candidate, $$m_{k^{n-2}}^{n-1}[k^{n-1}], \text{ and } \mathbb{C}_{k^{n-1}}^n$$

is the $n^{th}$ user's constraint set that contains the resource constraints $$P(m) \leq P^n(m_{k^{n-1}}^n[k^{n-1}]) = P(m^{n-2}[\kappa^{n-2}]) - P^{n-1}(m_{k^{n-2}}^{n-1}[k^{n-1}])$$

$$C(m) \leq C^n(m_{k^{n-1}}^n[k^{n-1}]) = C(m^{n-2}[\kappa^{n-2}]) - C^{n-1}(m_{k^{n-2}}^{n-1}[k^{n-1}])$$

plus other constraints. The corresponding data rates are $$\mathcal{R}^n = \{\gamma_{k^{n-1}}^n, k^{n-1} = 1, 2, \ldots, K_{k^{n-2}}^{n-1}\} \tag{23}$$

where $$\gamma_{k^{n-1}}^n = \max_{m \in M}\{R(m): \mathbb{C}_{k^{n-1}}^n\} \tag{24}$$

is the data rate corresponding to the MCS candidate set, $M_{k^{n-1}}^n$.

Now we can select the $n-1^{th}$ user's optimal MCS from the candidate set in (22) by maximizing the $n^{th}$ user's data rate $$\kappa^{n-1} = \underset{k^{n-1} \in \{1,2,\cdots,K_{k^{n-2}}^{n-1}\}}{\arg\max} \{\gamma_{k^{n-1}}^n\}, \tag{25}$$

i.e., $$m_{k^{n-2}}^{n-1}[\kappa^{n-1}].$$

As a result, the corresponding maximum rate MCS candidates set for the $n^{th}$ user is therefore $$M_{\kappa^{n-1}}^n = \{m_{\kappa^{n-1}}^n[k^n], k^n = 1, 2, \ldots, K_{\kappa^{n-1}}^n\} \tag{26}$$

with associated data rate of $\gamma_{\kappa^{n-1}}^n$.

If the $n^{th}$ user is not the last user, i.e., n<N, its optimal MCS selection can be done by repeating the procedure as discussed above, i.e., by first finding the set of $n+1^{th}$ user maximum data rate MCS candidate set corresponding to the $n^{th}$ user's MCS candidate set in (26)

$$\mathcal{M}^{n+1} = \{\mathcal{M}_{k^n}^{n+1}, k^n = 1, 2, \ldots, K_{k^{n-1}}^n\} \tag{27}$$

where $$\mathcal{M}_{k^n}^{n+1} = \{m_{k^n}^{n+1}[k^{n+1}], k^{n+1} = 1, 2, \ldots, K_{k^n}^{n+1}\} \tag{28}$$

$$= \underset{m \in \mathcal{M}}{\arg\max}\{R(m): \mathbb{C}_{k^n}^{n+1}\}$$

with corresponding data rates $$\mathcal{R}^{n+1} = \{\gamma_{k^n}^{n+1}, k^n = 1, 2, \ldots, K_{k^{n-1}}^n\} \tag{29}$$

where $$\gamma_{k^n}^{n+1} = \max_m\{R(m): \mathbb{C}_{k^n}^{n+1}\} \tag{30}$$

The $n^{th}$ user's MCS is then chosen to maximize the $n+1^{th}$ user's data rate $$\kappa^n = \underset{k^n \in \{1,2,\cdots,K_{k^{n-1}}^n\}}{\arg\max} \{\gamma_{k^n}^{n+1}\} \tag{31}$$

or $$m_{k^{n-1}}^n[\kappa^n]$$

If the $n^{th}$ user is the last user, i.e., n=N and since these MCS candidates in (26) provide the same data rate, the optimization is simply done by choosing the one with the minimum required power $$\kappa^n = \underset{k^N \in \{1,2,\cdots,K_{k^{N-1}}^N\}}{\arg\min} P(m_{k^{N-1}}^N[k^N]) \tag{32}$$

or $$m_{k^{N-1}}^N[\kappa^N]$$

Figure 2:
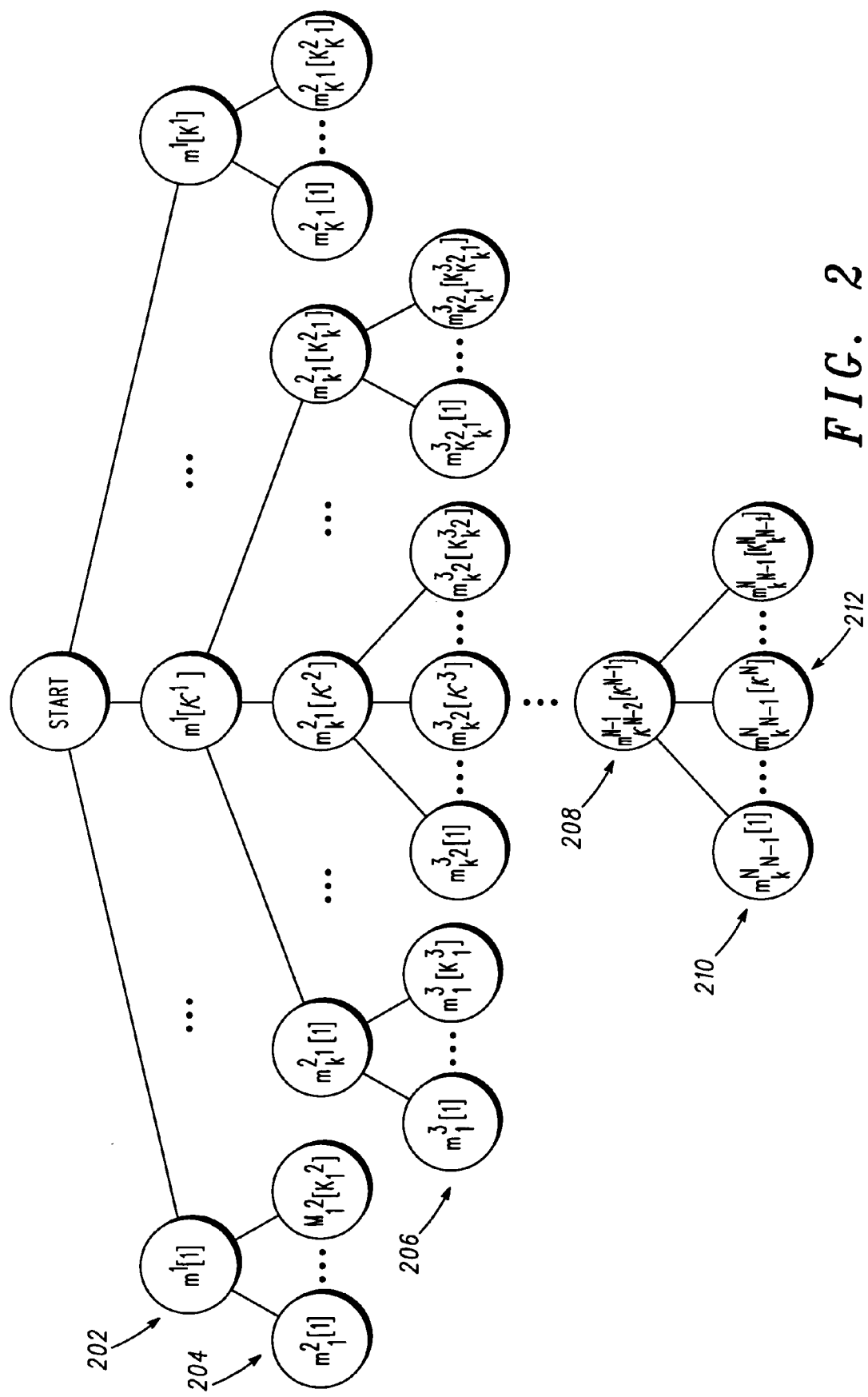
FIG. 2 depicts a modulation and coding scheme selection diagram.

The technique disclosed herein above is summarized in FIG. 2. The first row 202 represents the first (highest priority) user's set of maximum rate MCS candidates. Similarly, the second and third rows 204, 206, respectively, represent the second and third user's set of maximum rate MCS candidates, while the next-to-last and last user's sets are depicted, respectively, in the rows 208, 210. Note also that the center column 212 represents the optimal MCS of each user's set of maximum rate MCS candidates, i.e., the MCS that produces the highest maximum data rate for the user in the next subsequent row.

Figure 3:
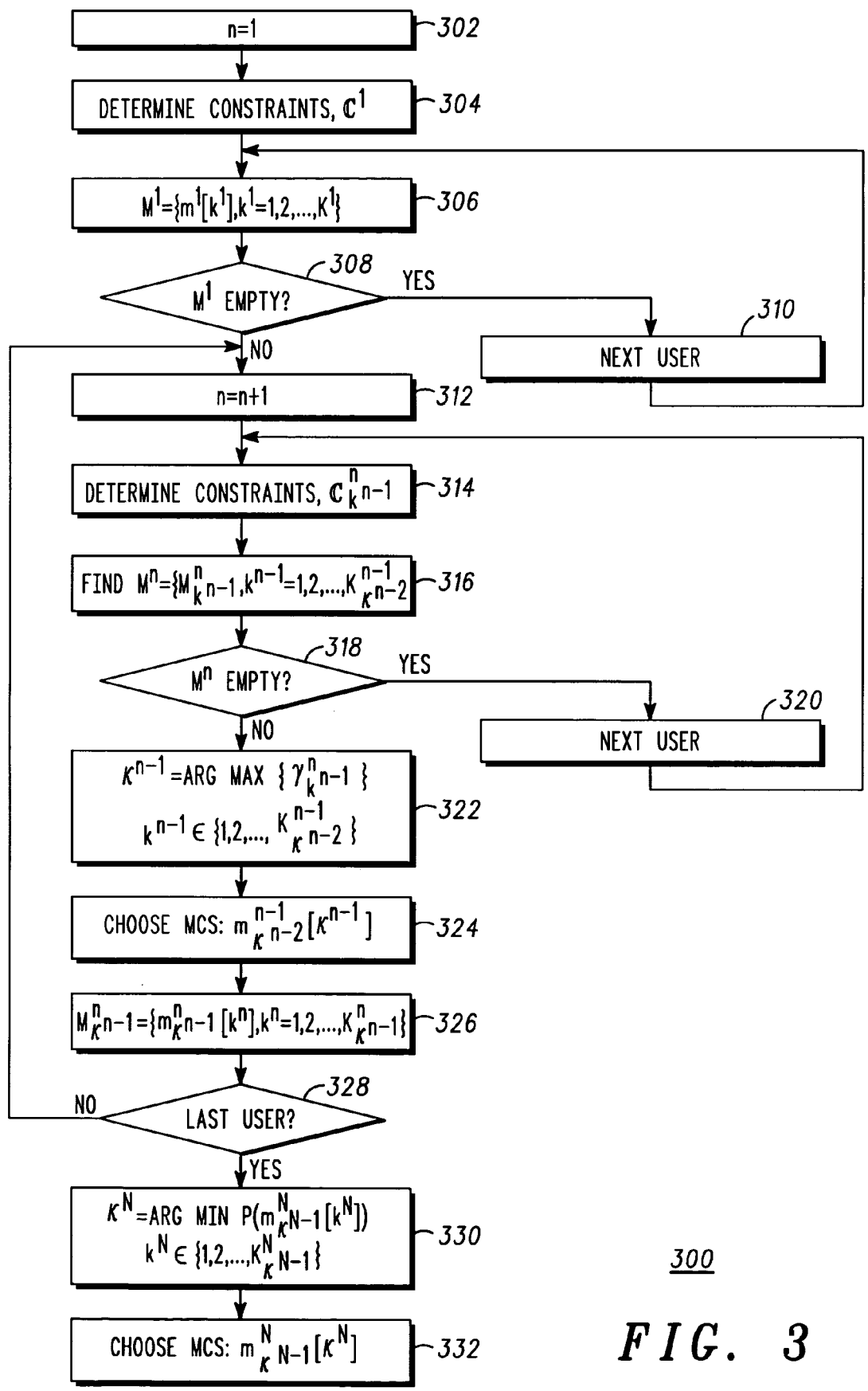
FIG. 3 is an exemplary flow diagram illustrating the operation of the scheduler.

Referring to FIG. 3, an exemplary flow diagram 300 illustrates operation of the scheduler 100 in accordance with the present invention. The flow begins with the initialization 302 of a user count. Next the processor 104 determines 304 the available resource constraints. The processor 104 then determines 306 the set of candidate MCSs that maximizes the first user's data rate, given the available resource constraints. At step 308 the processor 104 checks whether the first user's set of candidate MCSs is empty. If so, at step 310 the processor 104 moves to the next user and the flow returns to step 306. If not, the flow moves to step 312, where the user counter is incremented by one. At step 314 the processor 104 determines the resource constraints remaining after applying each of the MCSs in the first user's candidate set. The processor 104 then forms 316 a group of candidate sets of MCSs for the nth user, one candidate set for each MCS of the preceding user's optimal candidate set. (Note that in the case of the first user the "optimal" candidate set is also the only candidate set.) At step 318 the processor 104 checks whether the group is empty. If so, the processor 104 advances 320 to the next user, and the flow returns to step 314. If not, the flow moves to step 322 to determine which MCS of the preceding user's optimal candidate set results in the highest maximum data rate for the nth user. The MCS that resulted in the highest data rate is then selected 324 as the optimal MCS for the preceding user. The processor then selects 326, from the group of candidate sets of MCSs for the nth user, the candidate set of MCSs corresponding to the optimal MCS of the preceding user, as the optimal candidate set of MCSs for the nth user. The processor then checks 328 whether the nth user is the last user. If not, the flow returns to step 312. If so, the processor 104 determines 330 which MCS of the last user's candidate set requires the least transmit power, and chooses 332 it as the optimal MCS for the last user.

Thus, it should be clear from the preceding disclosure that the present invention provides a method and apparatus for selecting a modulation and coding scheme in a wireless communication system. The method and apparatus advantageously selects the modulation and coding scheme in a manner that optimizes the data rate of all users in the system.

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

The invention claimed is:

1. A method for selecting a modulation and coding scheme (MCS) to be used when sending messages in a wireless communication system, the method comprising:

determining a first set of MCSs, each of which produces a maximum data rate for a first user, in accordance with available resource constraints of the wireless communication system;

forming, for each MCS of the first set, a second set of MCSs that produces the maximum data rate for a second user in accordance with a first residual resource that remains when applying that MCS to the first user, thereby producing a group of second sets of MCSs; and after producing the group of second sets, selecting, from the first set and for the first user, a first optimal MCS corresponding to one of the group of second sets that allows a highest maximum data rate for the second user.

2. The method of claim 1, further comprising:

selecting the one of the group of second sets that allows the highest maximum data rate for the second user as an optimal second set of MCSs for the second user;

forming, for each MCS of the optimal second set, a third set of MCSs that produces the maximum data rate for a third user in accordance with a second residual resource that remains when applying that MCS of the optimal second set to the second user, thereby producing a group of third sets of MCSs; and after producing the group of third sets, selecting, from the optimal second set and for the second user, a second optimal MCS corresponding to one of the group of third sets that allows the highest maximum data rate for the third user.

3. The method of claim 1, further comprising:

determining a last set of MCSs that produces the maximum data rate for a last user; and selecting as a last optimal MCS for the last user the MCS from the last set that minimizes a required power.

4. The method of claim 1, further comprising determining one of the available resource constraints from a maximum number of codes available for use.

5. The method of claim 1, further comprising determining one of the available constraints from a maximum transmit power that can be allocated.

6. The method of claim 1, wherein determining the first set of MCSs comprises eliminating any MCS that requires more transmit power than can be allocated.

7. The method of claim 1, wherein determining the first set of MCSs comprises eliminating any MCS that requires more codes than are available.

8. A scheduler for selecting a modulation and coding scheme (MCS) to be used when sending messages in a wireless communication system, the scheduler comprising:

a processor for controlling the scheduler;

a memory coupled to the processor and comprising executable instructions and data for programming the processor; and a system interface coupled to the processor for interfacing the processor with the wireless communication system, wherein the processor is programmed to:

determine a first set of MCSs, each of which produces a maximum data rate for a first user, in accordance with available resource constraints of the wireless communication system;

form, for each MCS of the first set, a second set of MCSs that produces the maximum data rate for a second user in accordance with a first residual resource that remains when applying that MCS to the first user, thereby producing a group of second sets of MCSs; and after producing the group of second sets, select from the first set and for the first user, a first optimal MCS corresponding to one of the group of second sets that allows a highest maximum data rate for the second user.

9. The scheduler of claim 8, wherein the processor is further programmed to:
   select the one of the group of second sets that allows the highest maximum data rate for the second user as an optimal second set of MCSs for the second user;
   form, for each MCS of the optimal second set, a third set of MCSs that produces the maximum data rate for a third user in accordance with a second residual resource that remains when applying that MCS of the optimal second set to the second user, thereby producing a group of third sets of MCSs; and
   after producing the third set, select, from the optimal second set and for the second user, a second optimal MCS corresponding to one of the group of third sets that allows the highest maximum data rate for the third user.

10. The scheduler of claim 8, wherein the processor is further programmed to:
   determine a last set of MCSs that produces the maximum data rate for a last user; and
   select as a last optimal MCS for the last user the MCS from the last set that minimizes a required power.

11. The scheduler of claim 8, wherein the processor is further programmed to determine one of the available resource constraints from a maximum number of codes available for use.

12. The scheduler of claim 8, wherein the processor is further programmed to determine one of the available resource constraints from a maximum transmit power that can be allocated.

13. The scheduler of claim 8, wherein the processor is further programmed to determine the first set of MCSs by eliminating any MCS that requires more transmit power than can be allocated.

14. The scheduler of claim 8, wherein the processor is further programmed to determine the first set of MCSs by eliminating any MCS that requires more codes than are available.

15. A software program stored in a computer readable medium for selecting a modulation and coding scheme (MCS) to be used when sending messages in a wireless communication system, the software program, when installed and executed on a processor of the wireless communication system, causing the processor to:
   determine a first set of MCSs, each of which produces a maximum data rate for a first user, in accordance with available resource constraints of the wireless communication system;
   form, for each MCS of the first set, a second set of MCSs that produces the maximum data rate for a second user in accordance with a first residual resource that remains when applying that MCS to the first user, thereby producing a group of second sets of MCSs; and
   after producing the group of second sets, select, from the first set and for the first user, a first optimal MCS corresponding to one of the group of second sets that allows a highest maximum data rate for the second user.

16. The software program of claim 15, further causing the processor to:
   select the one of the group of second sets that allows the highest maximum data rate for the second user as an optimal second set of MCSs for the second user;
   form, for each MCS of the optimal second set, a third set of MCSs that produces the maximum data rate for a third user in accordance with a second residual resource that remains when applying that MCS of the optimal second set to the second user, thereby producing a group of third sets of MCSs; and
   after producing the group of third sets, select, from the optimal second set and for the second user, a second optimal MCS corresponding to one of the group of third sets that allows the highest maximum data rate for the third user.

17. The software program of claim 15, further causing the processor to:
   determine a last set of MCSs that produces the maximum data rate for a last user; and
   select as a last optimal MCS for the last user the MCS from the last set that minimizes a required power.

18. The software program of claim 15, further causing the processor to determine one of the available resource constraints from a maximum number of codes available for use.

19. The software program of claim 15, further causing the processor to determine one of the available constraints from a maximum transmit power that can be allocated.

20. The software program of claim 15, further causing the processor, in determining the first set of MCSs, to eliminate any MCS that requires more transmit power than can be allocated.

21. The software program of claim 15, further causing the processor, in determining the first set of MCSs, to eliminate any MCS that requires more codes than are available.

* * * * *